(12) United States Patent
Lee

(10) Patent No.: US 7,081,020 B1
(45) Date of Patent: Jul. 25, 2006

(54) SLIDE-OUT ELECTRONIC CARD CONNECTOR

(75) Inventor: Ipson Lee, Taoyuan (TW)

(73) Assignee: Super Link Electronics Co., Ltd., Taoyuan (TW)

( * ) Notice: Subject to any disclaimer, the term of this patent is extended or adjusted under 35 U.S.C. 154(b) by 0 days.

(21) Appl. No.: 11/037,352

(22) Filed: Jan. 19, 2005

(51) Int. Cl.
*H01R 24/00* (2006.01)

(52) U.S. Cl. .................. 439/630; 439/946
(58) Field of Classification Search .......... 439/630, 439/945, 946
See application file for complete search history.

(56) References Cited

U.S. PATENT DOCUMENTS

| | | | |
|---|---|---|---|
| 5,655,917 A * | 8/1997 | Kaneshige et al. ........ | 439/155 |
| 6,101,372 A * | 8/2000 | Kubo ........................ | 455/558 |
| 6,261,113 B1 * | 7/2001 | Chen ......................... | 439/260 |
| 6,561,851 B1 * | 5/2003 | Florescu .................... | 439/630 |
| 6,568,960 B1 * | 5/2003 | Bricaud et al. ............ | 439/630 |
| 6,602,096 B1 * | 8/2003 | Kronestedt et al. ....... | 439/630 |
| 6,773,308 B1 * | 8/2004 | Lwee ......................... | 439/630 |
| 6,805,589 B1 * | 10/2004 | Lee ............................ | 439/630 |

* cited by examiner

*Primary Examiner*—Hae Moon Hyeon
(74) *Attorney, Agent, or Firm*—Rosenberg, Klein & Lee

(57) ABSTRACT

A slide-out electronic card connector includes a seat body and a slide cavity being defined between two opposite sides of the seat body. Multiple terminals are inlaid in the seat body. A cartridge snugly slidably disposed in the slide cavity of the seat body. An electronic card can be stably received in an electronic card receiving cavity of the cartridge and electrically connected with the terminals in the seat body when the cartridge with the electronic card is slid into the seat body. When the cartridge is slid into the seat body, a resilient latch arm is correspondingly latched in a fixing latch dent for preventing the cartridge from slipping out of the seat body. When a user outward draws the cartridge, the resilient latch arm is unlatched from the fixing latch dent, permitting the cartridge to be drawn out of the seat body and totally separated therefrom.

2 Claims, 6 Drawing Sheets

SLIDE-OUT ELECTRONIC CARD CONNECTOR

BACKGROUND OF THE INVENTION

1. Field of the Invention

The present invention is related to a slide-out electronic card connector, and more particularly to an electronic card connector in which the cartridge can be totally drawn out of the seat body without being suspended from the seat body. Therefore, a user can conveniently place the electronic card into the cartridge. Moreover, the breakage of the cartridge due to incautious collision can be avoided.

2. Description of the Prior Art

In use of a cellular phone or a telecommunication equipment installed in a car, an electronic card must be inserted in the phone to achieve burglarproof and identification effect. In order to facilitate the installation and connection between the electronic card and the telecommunication equipment, my former invention entitled "memory card socket with drawer-type cartridge" now be issued as U.S. Pat. No. 6,805,589 discloses a memory card socket including a seat body having a bottom board section and a top board section. A slide cavity is defined between the bottom board section and the top board section. Multiple terminals are inlaid in the seat body. The socket further includes a cartridge having a board body snugly slidably disposed in the slide cavity. The board body is formed with a memory card receiving cavity in which a memory card can be stably received. A front board is connected with front edge of the board body. When the board body is slid into the seat body, the front board totally blocks the entrance of the slide cavity of the seat body to prevent alien particles or dusts from entering the seat body through the entrance of the slide cavity. At least one locating section is disposed on rear side of the cartridge. When drawing the cartridge out of the seat body, the locating section hooks a stop section in the slide cavity of the seat body for stopping the cartridge from detaching out of the seat body.

In the above structure, when a user installs an electronic card or a memory card, it is necessary to draw the cartridge outward. At this time, due to the limitation of the locating section, the cartridge cannot be totally slid out of the seat body. Therefore, the cartridge is longitudinally suspended from the seat body. In use, it often takes place that the cartridge is incautiously hit or pressed and broken. Once the cartridge is damaged, it is impossible to insert the electronic card into the seat body. In the case that this component is not serviceable or replaceable, the mobile phone will become unusable. In the case that a cartridge of the telecommunication system mounted on a car is broken, it will be more difficult to repair or replace the component.

SUMMARY OF THE INVENTION

It is therefore a primary object of the present invention to provide a slide-out electronic card connector including: a seat body, a slide cavity being defined between two opposite sides of the seat body, multiple terminals being inlaid in the seat body; and a cartridge snugly slidably disposed in the slide cavity of the seat body. The cartridge is formed with at least one electronic card receiving cavity in which an electronic card can be stably received. When the cartridge with the electronic card is slid into the seat body, the electronic card is electrically connected with the terminals in the seat body. The cartridge has a resilient latch arm at front end. When the cartridge is slid into the seat body, the resilient latch arm is correspondingly latched in a fixing latch dent for preventing the cartridge from slipping out of the seat body. When a user outward draws the cartridge, the resilient latch arm is unlatched from the fixing latch dent, permitting the cartridge to be drawn out of the seat body and totally separated therefrom.

The present invention can be best understood through the following description and accompanying drawings wherein:

DETAILED DESCRIPTION OF THE PREFERRED EMBODIMENTS

Figure 1:
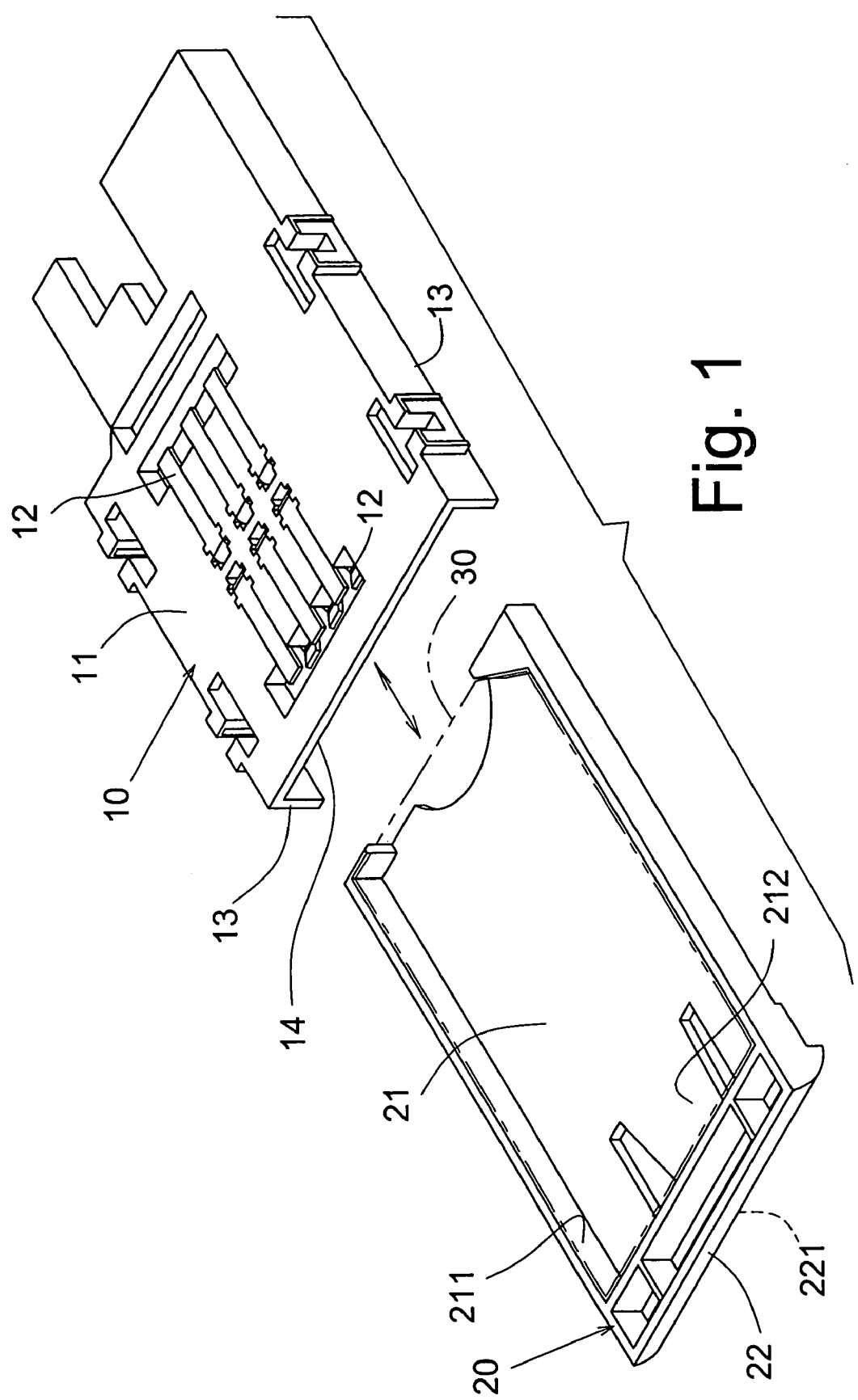
FIG. 1 is a perspective exploded view of the present invention, in which the cartridge is separated from the seat body.

Please refer to FIGS. 1 to 6. The slide-out electronic card connector of the present invention includes a seat body 10. A slide cavity 14 is defined between two opposite sides of the seat body 10. Multiple terminals 12 are inlaid in the seat body 10. The slide-out electronic card connector of the present invention further includes a cartridge 20 snugly slidably disposed in the slide cavity 14 of the seat body 10. The cartridge 20 is formed with at least one electronic card receiving cavity 211 in which an electronic card 30 can be stably received. The cartridge 20 with the electronic card 30 can be slid into the seat body 10, whereby the electronic card 30 can be electrically connected with the terminals 12 in the seat body 10. The slide-out electronic card connector of the present invention is characterized in that the cartridge 20 has a resilient latch arm 212. When the cartridge 20 is slid into the seat body 10, the resilient latch arm 212 is correspondingly latched in a fixing latch dent 40 for preventing the cartridge 20 from slipping out of the seat body 10. When a user outward draws the cartridge 20, the resilient latch arm 212 is unlatched from the fixing latch dent 40, permitting the cartridge 20 to be drawn out of the seat body 10 and totally separated therefrom.

Figure 2:
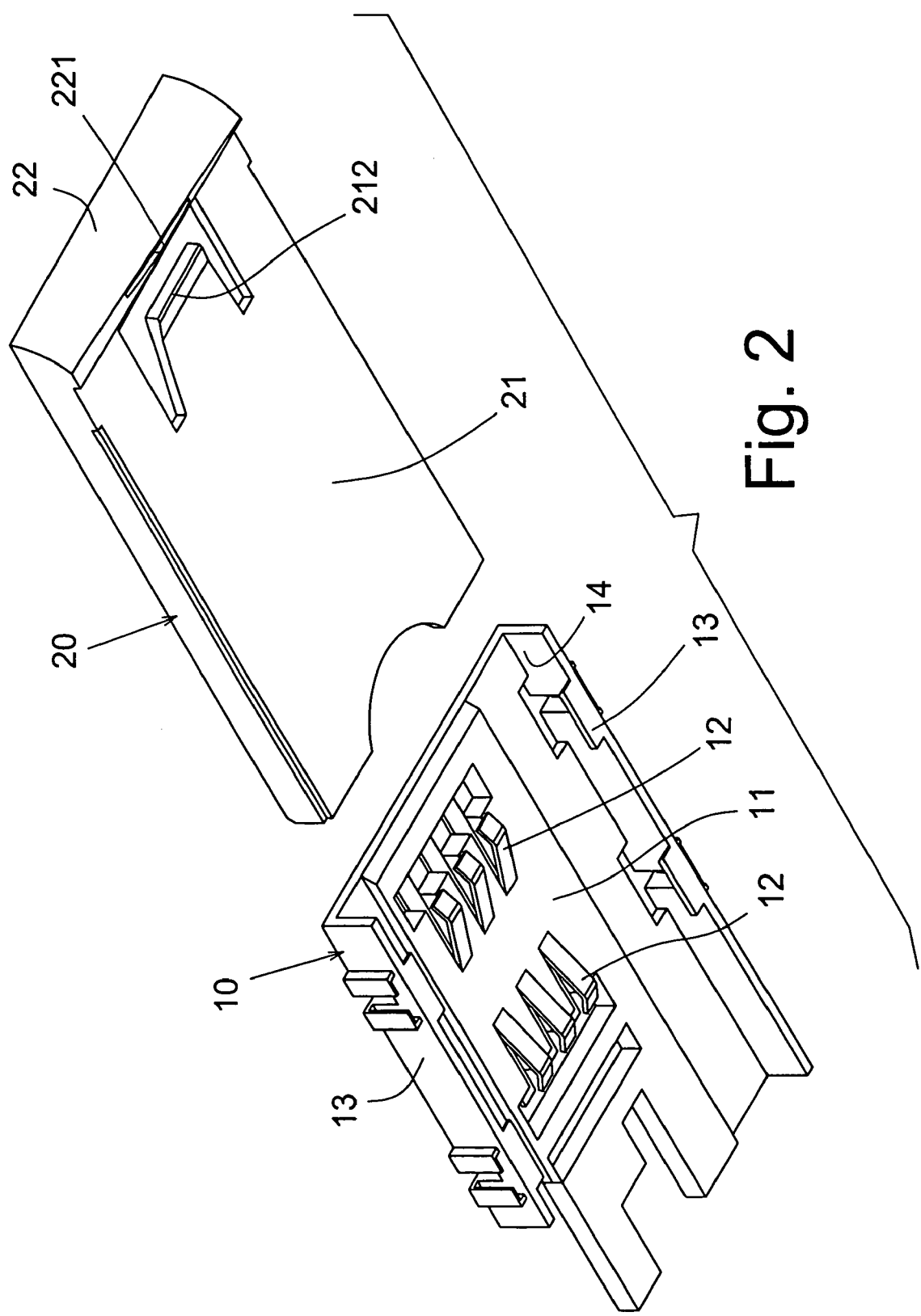
FIG. 2 is a bottom view according to FIG. 1.
Figure 3:
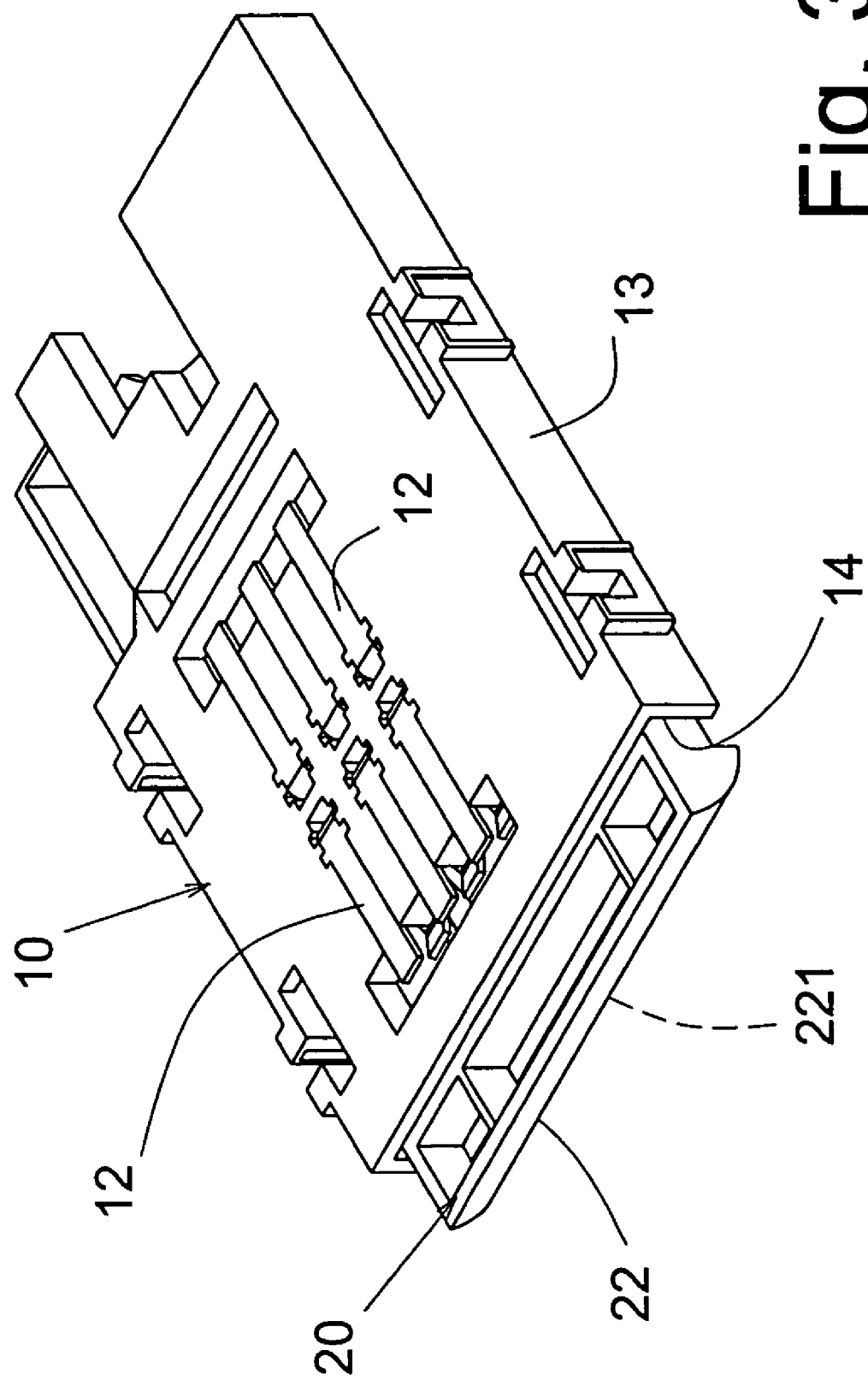
FIG. 3 is a perspective exploded view of the present invention, in which the cartridge is pushed into the seat body.
Figure 4:
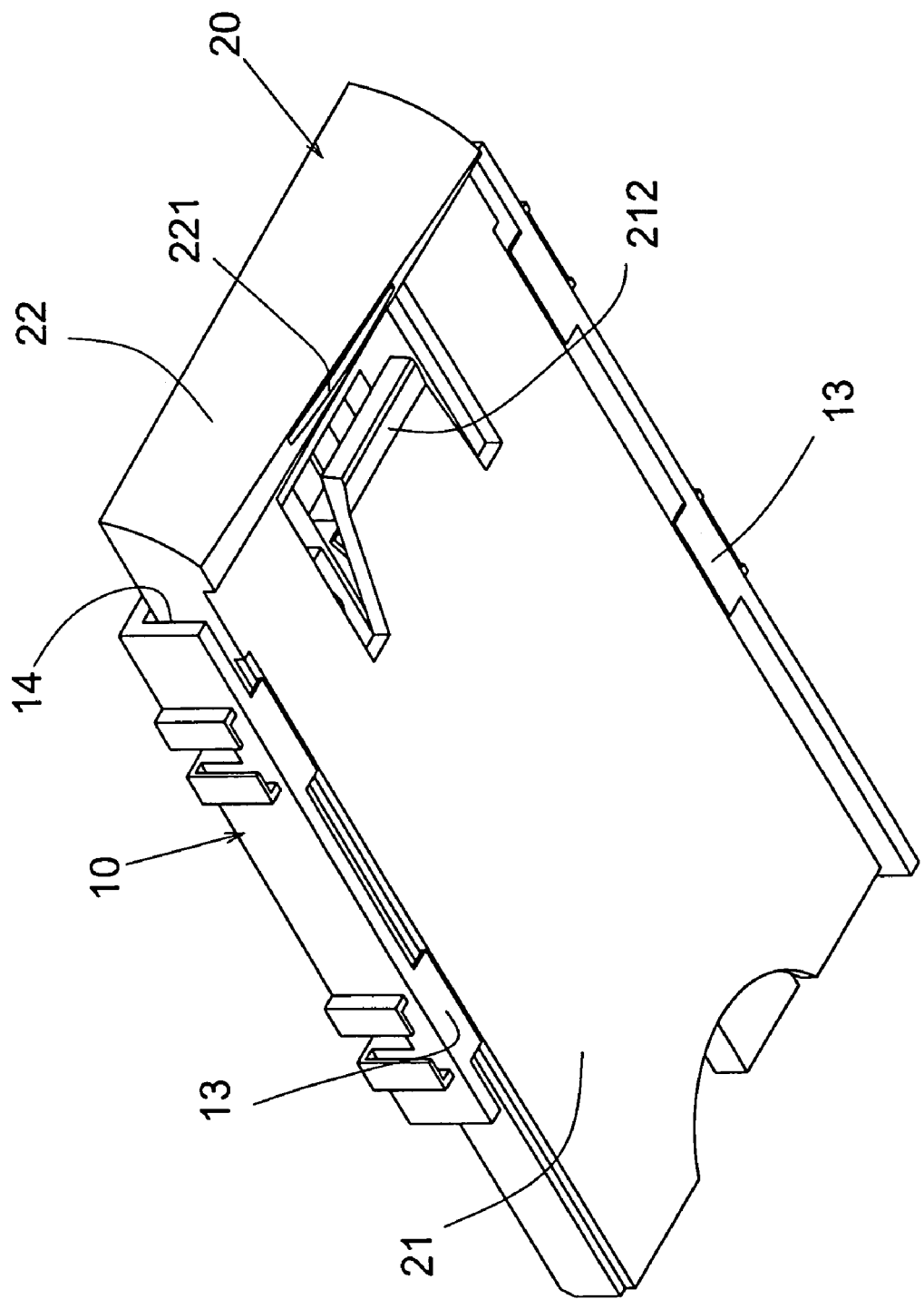
FIG. 4 is a bottom view according to FIG. 3.
Figure 5:
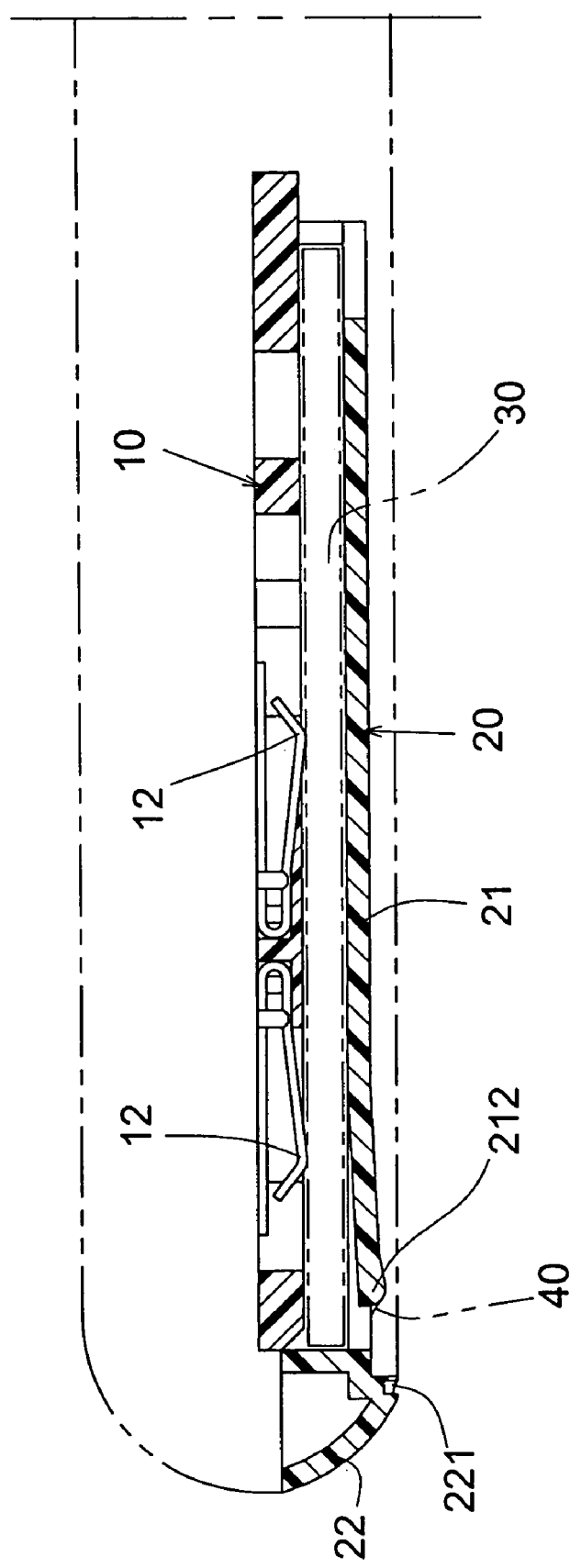
FIG. 5 is a sectional view showing that the present invention is mounted in an electronic appliance.

Referring to FIGS. 1 and 2, the seat body 10 has a board body 11 in which multiple terminals 12 are inlaid. Two L-shaped sideboards 13 are formed on two opposite sides of the seat body 10. A slide cavity 14 is defined between the two sideboards 13.

The cartridge 20 has a rest board 21 formed with at least one electronic card receiving cavity 211 in which an electronic card 30 can be snugly received. The rest board 21 is formed with at least one resilient latch arm 212. A front board 22 is integrally connected with front edge of the rest board 21. When the cartridge 20 is slid into the seat body 10, the front board 22 blocks the entrance of the slide cavity 14 of the seat body 10. The bottom of the front board 22 is formed with a finger recess 221. A user's finger can extend into the finger recess 221 to draw the cartridge 20 out of the seat body 10.

Referring to FIGS. 1 and 2, when taking out or replacing the electronic card 30, the cartridge 20 can be totally drawn out of the seat body 10 without longitudinally suspending from the seat body 10. Therefore, the breakage of the cartridge 20 due to incautious collision can be avoided.

The fixing latch dent 40 in which the resilient latch arm 212 is latched can be formed on an electronic appliance on which the connector is mounted, such as a mobile phone and a digital camera or a car body or the seat body 10. This is not limited.

Figure 6:
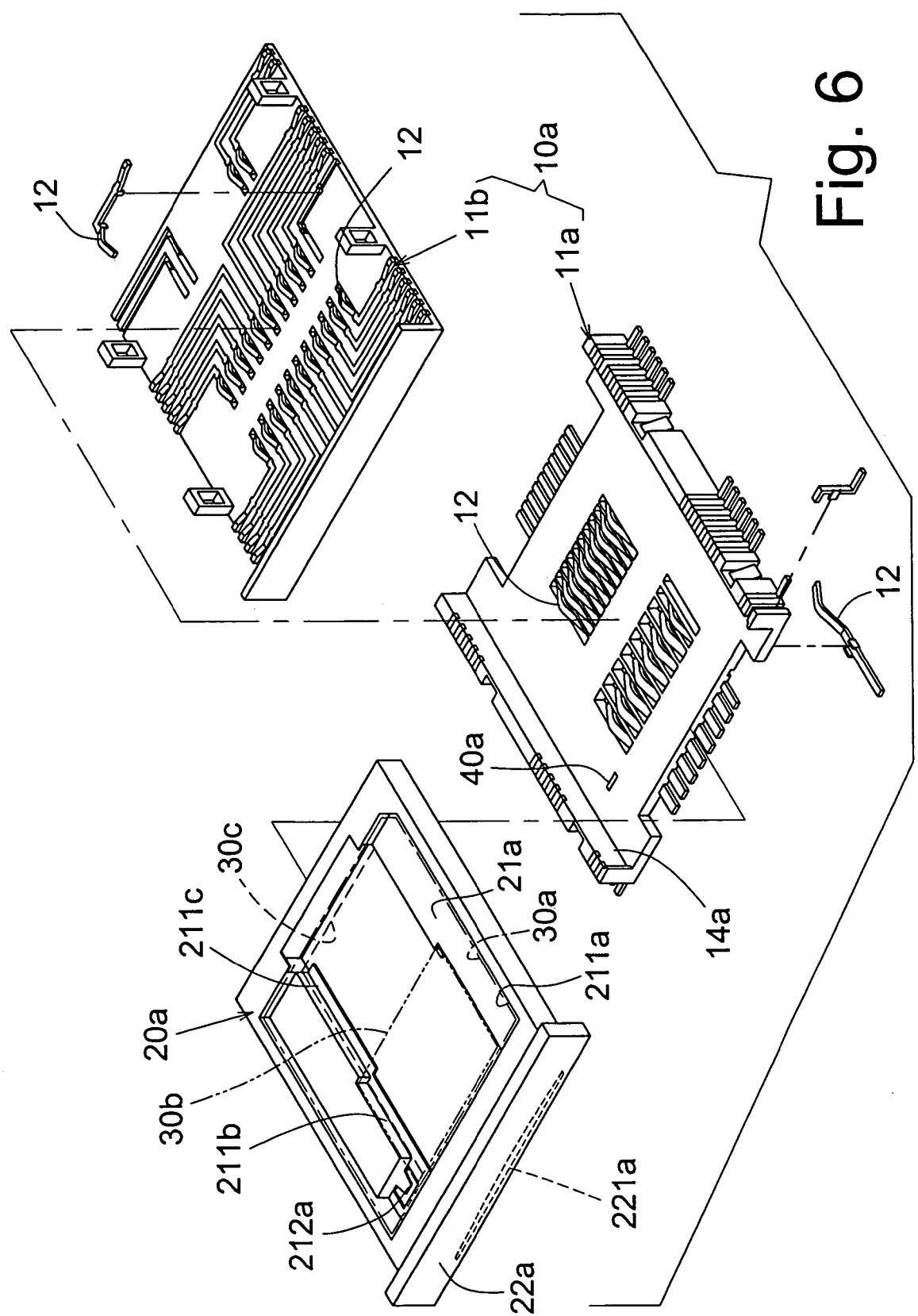
FIG. 6 is a perspective exploded view of another embodiment of the present invention.

FIG. 6 shows a second embodiment of the present invention, in which the electronic card connector includes a seat body 10a having a bottom board section 11a and a top board section 11b. A slide cavity 14a is defined between the bottom board section 11a and the top board section 11b. Multiple terminals 12 are inlaid in the bottom board section 11a and the top board section 11b. The connector further includes a cartridge 20a having a rest board 21a snugly slidably disposed in the slide cavity 14a of the seat body 10a. The rest board 21a is formed with multiple types of electronic card receiving cavities 211a, 211b, 211c in each of which a corresponding type of electronic card 30a, 30b, 30c can be stably received. When the cartridge 20a is slid into the slide cavity 14a of the seat body 10a, the electronic card 30a, 30b, 30c can be electrically connected with the terminals 12 in the seat body 10a for transmitting electronic signal. The rest board 21a has a resilient latch arm 212a. When the cartridge 20a is slid into the seat body 10a, the resilient latch arm 212a is correspondingly latched in a fixing latch dent 40a for preventing the cartridge 20a from slipping out of the seat body 10a. When a user outward draws the cartridge 20a, the resilient latch arm 212a is unlatched from the fixing latch dent 40a, permitting the cartridge 20a to be drawn out of the seat body 10a and totally separated therefrom.

Referring to FIG. 6, a front board 22a is connected with front edge of the rest board 21a. When the cartridge 20a is slid into the seat body 10a, the front board 22a blocks the entrance of the slide cavity 14a of the seat body 10a so as to prevent alien particles or dusts from entering the seat body 10a through the entrance of the slide cavity 14a. A lateral side of the front board 22a is formed with a finger recess 221a. A user's finger can extend into the finger recess 221a to push the cartridge 20a out of the seat body 10a.

The embodiment of the electronic card connector of the present invention as shown in FIG. 6 is applicable to various types of electronic cards. Such technique has already been disclosed in U.S. Pat. No. 6,805,589 entitled "memory card socket with drawer-type cartridge" and will not be further described hereinafter.

As shown in FIG. 6, the fixing latch dent 40a is formed on the bottom board section 11a of the seat body 10a. When the cartridge 20a is slid into the seat body 10a, the resilient latch arm 212a is correspondingly latched in the fixing latch dent 40a for preventing the cartridge 20a from slipping out of the seat body 10a. Alternatively, the fixing latch dent 40a can be formed on an electronic appliance such as a mobile phone and a digital camera or a car body. This is not limited.

According to the above arrangement, the present invention has the following advantages:

1. The cartridge can be totally drawn out of the seat body without being suspended from the seat body and exposed to outer side thereof. Therefore, a user can conveniently place the electronic card into the cartridge. Moreover, the breakage of the cartridge 20 due to incautious collision can be avoided. Therefore, the using life of the electronic card connector is prolonged.

2. The resilient latch arm is disposed at front end of the cartridge. When the cartridge is slid into the seat body, the resilient latch arm is correspondingly latched in the fixing latch dent for preventing the cartridge 20a from slipping out of the seat body. When a user outward draws the cartridge, the resilient latch arm is unlatched from the fixing latch dent, permitting the cartridge to be drawn out of the seat body and totally separated therefrom.

3. The bottom of the front board is formed with a finger recess for easily drawing the cartridge out of the seat body. The front face of the front board is flush with the outer face of the connector so that the connector has a tidy appearance.

The above embodiments are only used to illustrate the present invention, not intended to limit the scope thereof. Many modifications of the above embodiments can be made without departing from the spirit of the present invention.

What is claimed is:

1. A slide-out electronic card connector comprising:
   (a) a seat body, a slide cavity being defined between two opposite sides of the seat body, multiple terminals being inlaid in the seat body; and
   (b) a cartridge snugly slidably disposed in the slide cavity of the seat body, the cartridge being formed with at least one electronic card receiving cavity in which an electronic card can be stably received and a front board is connected with a front edge of a rest board of the cartridge wherein a finger recess is formed under a bottom of the front board, whereby when the cartridge with the electronic card is slid into the seat body said front board is flush against said seat body and is devoid of openings for prevention of dust and alien particles entering said seat body, the electronic card is electrically connected with the terminals in the seat body, said slide-out electronic card connector being characterized in that the cartridge has a resilient latch arm at front end, whereby when the cartridge is slid into the seat body, the resilient latch arm is correspondingly latched in a fixing latch dent for preventing the cartridge from slipping out of the seat body, when a user outward draws the cartridge, the resilient latch arm being unlatched from the fixing latch dent, permitting the cartridge to be drawn out of the seat body and totally separated therefrom.

2. A slide-out electronic card connector comprising:
   (a) a seat body having a bottom board section and a top board section, a slide cavity being defined between the bottom board section and the top board section, multiple terminals being inlaid in the bottom board section and the top board section; and
   (b) a cartridge having a rest board snugly slidably disposed in the slide cavity of the seat body and a front board connected with the front edge of the rest board of the cartridge, whereby a finger recess is formed under a bottom of the front board, the rest board being formed with multiple types of electronic card receiving cavities in each of which a corresponding type of electronic card can be stably received, whereby when the cartridge is slid into the slide cavity of the seat body said front board is flush against said seat body and is devoid of openings for prevention of dust and alien particles entering said seat body, the electronic card can be electrically connected with the terminals in the seat body, said slide-out electronic card connector being characterized in that the rest board of the cartridge has a resilient latch arm, whereby when the cartridge is slid into the seat body, the resilient latch arm is correspondingly latched in a fixing latch dent for preventing the cartridge from slipping out of the seat body, when a user outward draws the cartridge, the resilient latch arm being unlatched from the fixing latch dent, permitting the cartridge to be drawn out of the seat body and totally separated therefrom.

* * * * *